Patented Jan. 21, 1941

2,229,305

UNITED STATES PATENT OFFICE 2,229,305

VARNISH MANUFACTURE

Malcolm F. Pratt, Woodbury, N. J., and Thomas L. Apjohn, Kew Gardens, and John Happel, Brooklyn, N. Y., assignors to Socony-Vacuum Oil Company, Incorporated, New York, N. Y., a corporation of New York No Drawing. Application May 13, 1938, Serial No. 207,716

2 Claims. (Cl. 134—26)

This invention relates to the manufacture of varnishes, in general, and is particularly concerned with the manufacture of varnishes containing China-wood oil.

Heretofore, varnishes have been prepared by batch processes. In the usual process a resin and oil mixture is cooked in a large kettle or pot over an open fire at a temperature around 500° F. until the resin and oil are so combined that they will not separate on cooling, and a suitable consistency or body has been developed. Generally, the large kettles are mounted on trucks whereby they can be rolled on and off of the fire in order to control the reaction. When the preparation of the varnish base is completed, it is withdrawn and, while still warm, a suitable thinner is added to give the desired consistency. Ordinarily, a dryer is also added to the varnish. Dryers, as, for instance, the oxides of lead, cobalt and manganese or mixtures thereof may be incorporated into the varnish by any suitable means, such as previously heating the dryer with the oil or adding it subsequently as, for example, along with the thinner.

The disadvantages and limitations of the processes afforded by the prior art are numerous. Among these disadvantages is the ever present danger of fire in the varnish factory. When heating a batch of resin and oil in a large kettle, an exact control over the temperature is practically impossible. Likewise rapid heating or sudden changing of the temperature of the mixture can not be effected. Further, since the main reactions involved are exothermic, they occasionally get beyond control at the high temperatures employed as, for instance, around 500° F., resulting in a foaming over of the reaction mixture, which, being highly inflammable, may catch on fire by falling into the fire serving to heat the kettles. Moreover, as the thinners are usually added while the varnish base is still quite hot, a portion thereof is volatilized. These combustible vapors form an additional fire hazard, as well as an appreciable production waste. Accordingly, any method which reduces fire hazards and waste in a varnish factory is of vital interest to the industry.

A further disadvantage of the prior processes is the partial oxidation that takes place due to a large surface of resin and oil in the kettle being exposed to the air while at a high temperature. Furthermore, since the kettle is heated to an extremely high temperature at the bottom in order to sufficiently heat the whole batch, there is considerable danger of local overheating of the material nearer the bottom, resulting in an inferior product. The danger of local overheating in a batch process is further increased because of the mechanical difficulties in maintaining a large batch of viscous varnish base agitated and thoroughly stirred.

In addition to the many disadvantages mentioned above, there is a distinct limitation to the capacity of the varnish factory operating on a batch principle. Each kettle being of a definite size does not afford flexibility for increasing the factory output and as each kettle with its firing means requires considerable space, varnish factories of large commercial production operating in accordance with the processes now enjoyed by the art require an inordinate amount of room space as compared to a factory of similar production capacity which operates according to our process.

While efforts have been made to improve the prior art processes as, for instance, by employing electrical heating means and radiant heat fires, it is quite obvious that even if these developments were employed they would not eliminate the many disadvantages such as local overheating, relatively long heating time due to use of lower temperatures, non-uniformity of product, necessity for large plant space, etc. Yet, in spite of these recognized disadvantages and limitation in the art, so far as is known, no-one has ever applied our novel process to the manufacture of varnishes.

It is an object of our invention to provide a process for the manufacture of varnishes which substantially eliminates the many disadvantages and limitations in the processes now afforded by the art. A further object is to provide a continuous process for the manufacture of varnishes and thereby reduce the fire hazard to a minimum. Still another object of the invention is to provide a process for the manufacture of varnishes which affords more exact control over rate of heating and any subsequent temperature changes, permits heat treating under pressure and substantially eliminates local overheating. A still further object of our invention is to provide a process for the manufacture of varnishes which affords greater production efficiency and yields a product of uniform qualities. The above and many other objects will be apparent from the following description of our invention.

Our invention is based upon the surprising discovery that finished varnishes can be produced in a continuous manner which obviates the many disadvantages and limitations of the processes afforded by the prior art, and that the varnishes so produced are comparable in every respect to the varnishes produced in the past. Thus, despite the fact that resin and oil when compounded to a varnish base form a highly viscous composition which in the case of varnishes comprising oils, such as China-wood oil, may result in the formation of a gel, we have discovered that highly satisfactory finished varnishes may be prepared by passing the ingredients thereof in a continuous manner, under proper conditions, through a suitable heating zone.

Contrary to prior processes which merely cook a mixture of resin and oil and then add thinners to this cooked mixture, our process is novel not only in that it is carried out in a continuous manner, but also it is novel in that it subjects the entire varnish, i. e. resin, oil and thinner to the cooking treatment whereby a complete and finished varnish is withdrawn from the heating zone. We found that when we attempted to first prepare a varnish base by our process, that is by merely passing a resin and China-wood oil mixture through the heating coil, we could not eliminate clogging difficulties due to the resin and oil composition forming a gel. However, upon addition of thinners to the resin and oil, whereby a finished varnish is produced in the heating zone, these clogging difficulties are avoided. It appears that by the addition of the thinner to the resin and oil, the viscosity of the mixture is reduced to such an extent that when this mixture is passed through the heater, there is a sufficiently turbulent flow that the mixture can be heated for the necessary length of time required to impart the desired physical properties to the varnish without encountering the gel formation which results when passing the relatively viscous mixture of resin and oil through the heater.

Accordingly, in practicing our invention, a homogeneous mixture of resin, oil and thinner is passed in a continuous manner through a heating zone such as a tube or coil heater at such a rate and under such conditions that at the temperature of the heating zone the stream of material will be sufficiently heated to convert it into the desired varnish composition, but will be insufficiently heated for effecting deleterious reactions. Our type of operation must be conducted under pressure due to the volatility of the thinners; however, this is easily accomplished since the heating is carried out in a closed conduit or coil. The coil may be heated by any suitable means, such as electrical resistance, gas or oil fire furnaces, etc. Temperature indicating devices may be placed along the coil so as to afford exact temperature control, either automatically or otherwise. In order to further insure against clogging difficulties, the tube or coil heater should be first brought to the temperature of reaction, usually between about 500° F. and about 680° F. Furthermore, the feed stock should be prepared in a heated condition, as for instance at a temperature of about 300° F. to 400° F., which is below reaction temperatures, and then introduced into the heated reaction tube or coil. By this method of operation, the varnish ingredients may be brought quickly to the temperature of reaction, reacted to the desired degree, and then removed before a sufficient time has elapsed for deleterious reactions to occur, such as reactions imparting non-drying properties to the varnish.

The thinners used in our process may be any of the usual thinners now employed in the varnish industry, such as turpentine, petroleum naphtha, coal tar naphtha, etc., and, moreover, may be added in the amount used in the finished varnish. Accordingly, in such cases, as has been mentioned, not only is the danger of pipe clogging avoided, but a finished varnish is withdrawn from the heating zone.

It has been found that the resins themselves have varying effects on the rates of reactions involved in the manufacture of varnishes. For instance, if we take the time required for bodying and compounding a mixture of China-wood oil and a phenol-formaldehyde resin, as, for example, a Bakelite resin, as a standard, then based on this standard, ester gum as well as some other resins considerably retard the rates of reactions required to produce the desired compounding, bodying, etc. and, therefore, when such resins are used, a longer period of heating must be afforded. In the case of some other resins, as, for instance, certain resins derived from petroleum, the rates of reactions are even increased. In our process for preparing varnishes comprising China-wood oil, we prefer to employ the phenol-formaldehyde class of resins as the rates of reactions then involved are most desirable from a practical standpoint. However, it is to be clearly understood that the other synthetic resins may be used, as, for example, coumarone resins, ester gum, etc., as well as natural resins.

The time of heating, which is governed by the temperature and the rate at which the materials are passed through the heating zone and the length of the heating zone, varies in each particular case, depending upon the materials treated, their proportions, properties desired in the finished product, etc. For instance, as has been pointed out hereinbefore, both the thinners and the resins have varying effects on the time of heating that may be employed. Moreover, as is well understood the proportions of resin, oil and thinner may be varied widely to produce varnish compositions of different characteristics. Therefore, it should be obvious that changes in the ingredients and the proportions of the ingredients vary the operating conditions. Moreover, increasing the time and temperature of heating generally increases the body of the varnish. Accordingly, these conditions also vary in accordance with the properties desired in the final product. It is believed clear, therefore, that definite limitations cannot be stated covering all the conditions of operation. However, it might be stated that temperatures between 500° F. and 680° F. are usually suitable for our process, while temperatures above 700° F. are generally not desirable, especially when preparing varnishes containing China-wood oil.

If China-wood oil is used in varnishes in a raw condition, the varnish coating checks and has a frosted appearance. Hence, it is imperative that the oil be cooked with the resin sufficiently to not only give it the desired body, but also to give it gas-proofness. In order to impart the above desired properties to the varnish, it must be heated above about 450 to 500° F. However, when the varnish is heated at too high a temperature as, for instance, above about 700° F., non-drying properties are imparted thereto, and for certain compositions this upper temperature limit is even much lower, as, for example, compositions comprising ester gum resins should generally not be heated substantially above 600° F. Therefore, for practical purposes it might be stated that the material treated should be heated at temperatures sufficient to give it the desired body and gas-proofness, but at temperatures below that which produce non-drying properties in the varnish.

The limit as to the length of time which the composition is heated depends upon the operating conditions, the ingredients being processed and the properties desired in the finished varnish and, therefore, should be regulated for each different mixture to afford sufficient length of time to give the desired compounding and bodying to the composition.

Therefore, to summarize in a general manner, it might be stated that a composition should be heated at a temperature above about 500° F. in order to effect the proper compounding, bodying and non-frosting or gas-proofness in the resultant product, but at a temperature below that at which non-drying properties are imparted thereto, and the time of heating at these temperatures should be sufficient to produce the required compounding, bodying and gas-proofness in the product. At the high temperatures which may be employed in our process, these operative conditions may be effected in a relatively short time, thus making a considerable saving in time over prior processes. The prior processes must operate at lower temperatures, since, if they attempted to heat a large batch up to the temperature of our process, the product would be over-heated before the temperature could be obtained.

Our process will be further illustrated by the following specific example. However, it is to be understood that nothing therein is to be construed in a limiting sense as there may be wide variations therefrom without departing from the spirit of the invention.

The apparatus for this example comprises a tubing coil heated by a gas fired furnace. To one end of the coil is connected a constant feed pump capable of delivering 500 pound pressure and to the other end a cooling coil in a water bath. On the end of the second coil is an adjustable pressure relief valve which, during operation, is so set as to give a total pressure drop from pump to valve of 500 pounds. Thermocouples are brazed at regular intervals along the coil.

A feed stock is prepared by heating one part of Bakelite resin XR254 and four parts of Chinawood oil to 300° F. and holding the mixture at this temperature for one hour, and then reducing with mineral spirits to 60% non-volatile. The feed stock needs only to be heated for a sufficient length of time to disperse or dissolve the resin throughout the oil and for many resins this period is about 10 to 15 minutes. However, in the case of Bakelite type resins, the feed stock must be heated for a longer period of time (e. g. about 1 hour) at the relatively low temperature as otherwise it has a tendency to form insoluble precipitates when heated to the temperatures of reaction. At this relatively low temperature no bodying or gelling reactions occur, hence it is not harmful to maintain the feed stock at this temperature for an extended period. However, having the feed stock preheated is also quite important in that it may then be quickly brought to reaction temperature when started through the heating coil.

In starting the process the heating coil is first brought to the temperature of operation by circulating mineral spirits through the coil until the temperature (as indicated by the thermocouples along the coil) of the last half of the heating coil has reached 400° F. The feed is then changed to varnish makers' linseed oil, and the heat gradually increased until 650° F.±10° F. is reached in the last half of the heating coil. The feed is then changed to the preheated homogeneous feed stock and the pressure regulated to 500 lbs. After a few minutes the receptacles are changed at the discharge end and the finished product collected continuously. If desired, the finished product leaving the heating coil may be passed through a heat exchanger containing the feed stock flowing into the heating coil. Driers may be incorporated in varnishes prepared by our process, if desired, just as in the conventional processes.

A varnish prepared in accordance with the instructions given above is quite comparable in drying time, gloss, flow and film characteristics to the same formulation made in the conventional manner by batch process. Moreover, this varnish can be produced continuously as a uniform product which never varies in its properties.

Although the conditions specified are to be preferred for the particular feed stock used, they may be varied within certain limits. The pressure is maintained on the discharge line primarily to prevent vaporization of the mineral spirits within the hot tube and should not, therefore, be allowed to drop below 150 lbs., in addition to whatever pressure drop there is in the hot coil. The rate of feed controls the body of the finished varnish and may be varied as desired, except that exceptionally low rates should be avoided because of danger of gelling at lower rates when turbulence is not so great. Since the rate of bodying for different feed stocks varies as pointed out hereinbefore, the rate of flow should be changed accordingly either independently or together with the temperature which is also a factor controlling the extent of bodying.

Accordingly, our process represents a decided advance over the processes enjoyed heretofore in the varnish industry. By heating the varnish in a tube coil, the fire hazard is reduced to a minimum and if for any reasons, such as a leak, the material in the tube should catch fire, valves may be provided along the tube, whereby the flow can be instantly stopped. Since the materials are passed continuously through a small tube with thorough mixing the heating is uniform, eliminating any danger of local overheating. Further, since the temperatpre and heating are uniform and may be exactly controlled, the reaction may be carried out at higher temperatures than is safe in batch operation, thereby speeding up the process and affording a saving in time. As a result of the exact control over the entire process, a uniform product is always produced, while in batch operation this is practically impossible since conditions therein cannot be exactly duplicated from batch to batch with exact control thereover. As is obvious from the fact that the material is in a closed tube, there is very little, if any, contact of the material at high temperature with air, resulting in deleterious oxidation. Moreover, the obnoxious fumes are easily controlled, which, in batch operation, is often a serious annoyance to the surrounding community as well as to the varnish factory.

While the invention has been described with particular reference to the preparation of varnishes comprising China-wood oil, it is to be understood that our process is applicable to the manufacture of varnishes comprising other drying oils, such as, for example, linseed oil, perilla oil, etc. and mixtures of these other oils with China-wood oil. Also there are now available various synthetic or treated oils, such as Synthetic A (dehydated castor oil), etc. which have been treated by various means to reduce the time required for them to body. These oils are also suitable for the purposes of our invention and, in fact, the closer they approach the quick bodying characteristics of China-wood oil, the more suitable they are from a practical point of view. Since China-wood oil is an extremely quick bodying oil, usually a longer period of heating must be afforded when other drying oils are employed.

We claim:

1. A continuous process for manufacturing a finished varnish composed of a resin, a quick-drying oil, and a thinner which comprises flowing a homogeneous dispersion of said resin and said oil in varnish-making proportions together with a sufficient amount of a varnish thinner to give a turbulent flow that prevents gelation difficulties through a restricted cooking zone at a temperature between about 500° and 700° F., but below temperatures that would substantially impair the drying properties of the varnish, and under sufficient pressure to maintain said thinner in the liquid state, said homogeneous dispersion of resin and oil possessing gelling tendencies when similarly passed through said cooking zone in the absence of said thinner, and withdrawing from the cooking zone a cooked mixture of said three ingredients which then remain in the finished varnish.

2. The process of claim 1 wherein the resin is homogeneously dispersed in the quick-drying oil by preheating to a temperature between about 300° and 400° F. before the thinner is added and the three ingredients are introduced into said cooking zone.

MALCOLM F. PRATT.
THOMAS L. APJOHN.
JOHN HAPPEL.